United States Patent [19]

Schmidt

[11] Patent Number: 4,899,627
[45] Date of Patent: Feb. 13, 1990

[54] ARRANGEMENT FOR CENTERING AND CLAMPING WORK PIECES

[75] Inventor: Rudolf Schmidt, Reichenbach, Fed. Rep. of Germany

[73] Assignee: EMAG Maschinenfabrik GmbH, Fed. Rep. of Germany

[21] Appl. No.: 204,694

[22] Filed: Jun. 18, 1988

[30] Foreign Application Priority Data

Jul. 14, 1987 [DE] Fed. Rep. of Germany ....... 3723249

[51] Int. Cl.$^4$ .............................................. B23B 5/14
[52] U.S. Cl. ...................................... 82/117; 82/903; 82/162; 279/35
[58] Field of Search .................... 82/2.5, 2 R, DIG. 5, 82/DIG. 6, 38 R; 269/156, 225, 239; 279/1 L, 106, 35

[56] References Cited

U.S. PATENT DOCUMENTS 3,643,715 2/1972 Hayes et al. ..................... 82/2.5

Primary Examiner—Frederick R. Schmidt
Assistant Examiner—Lawrence Cruz
Attorney, Agent, or Firm—Darby & Darby

[57] ABSTRACT

An arrangement for centering and clamping of work pieces comprises tension levers swingably supported on a base plate, the tension levers of which are arranged coaxially on a pivot, while the other tension lever is supported on a second pivot which has the same distance to the center of the arrangement as the hinge pin. The contact surfaces with which the tension levers grasp a work piece, are designed so that the perpendicular line extends on the particular tangent at the contact point between contact surface and work piece through the center of the arrangement. This forces the work piece, independently of its diameter, continuously into the center in the clamping process and, consequently, centers it. Due to the arrangement of the tension levers, inserting work pieces transversely to the chuck axis is possible in spite of the center clamping process.

6 Claims, 3 Drawing Sheets

… …

ARRANGEMENT FOR CENTERING AND CLAMPING WORK PIECES

FIELD OF THE INVENTION

The invention relates to an arrangement for centering and clamping work pieces with three tension levers rotatably supported around pivots arranged parallel to the chunk axis, which can be driven synchronously and the pivots of which are equidistant from the chuck axis.

BACKGROUND OF THE INVENTION

In the processing of work pieces when automatically feeding the raw parts, it is necessary that the work pieces arriving successively on a conveying means are grasped and that they are passed after they have been centered to a gripper of a loading arrangement or directly to the tension chuck of a machine tool. For this purpose, a so-called transfer box has been arranged at the end of a conveyer belt or a chain conveyer, into which the individual work pieces are transported and from which the work pieces can be taken over by a gripper of a loading arrangement. The box is frequently constructed as a hinged box in order to bring the work pieces, which arrive lying flat, into an upright position. In this arrangement, the box has fixedly adjusted stops, which are set for the particular work piece diameter in order to center the arriving work piece, which is pressed by the conveying means against the stops for the centered transfer to the gripper. Of disadvantage in such transfer boxes is the fact that they are prepared only for work pieces of a given diameter, and that—when moving to other work pieces—the box must be changed. This is not only time-consuming but also extremely tedious because this transfer box is located behind the processing room and the operator must carry out the exchange either from above through a corresponding entry hatch or through the work space of the machine tool. Not only must safety precautions be maintained in order to avoid danger of injury within the working space, but this process is also tedious because of the position of the transfer box, which is difficult to access, and the fact that the working space is contaminated with coolants and chips.

A further disadvantage of this transfer box is that the work piece rests only against stops and is not clamped, so that, when transferring it to a gripper chuck, it must be assured that the work piece does not move from its stops before the gripper chuck has gripped it securely.

SUMMARY OF THE INVENTION

It is, therefore, an object of the invention to create an arrangement for centering and clamping work pieces such that work pieces can be clamped and centered over a large range of diameters and, further, to provide the possibility of placing the work pieces into this arrangement transversely to the chuck axis. Hence, the possibility must be provided of inserting the work pieces laterally into the tension arrangement and to center them subsequently without the work pieces being pressed out of the center of the clamping arrangement during the clamping process.

In accordance with the invention, in an arrangement for centering the champing work pieces with three tension levers pivoted around pivots arranged parallel to the chuck axis, which can be driven synchronously and the pivots of which are equidistant to the chuck axis, the improvement comprises that two pivots are provided, one of the pivots serving to support two tension levers. Further, the lengths of the tension levers are greater than the distance of the pivot to the chuck axis. The connecting lines of the axes of both pivots form an angle with the chuck axis which is smaller or equal to 180°. The contact surfaces of the tension levers for gripping the work pieces are convex so that the straight lines on the work pieces, which in the particular contact point are perpendicular to the tangents, extend through the chuck axis. Straight lines connecting the contact points of the two outer tension levers with the chuck axis—when viewed from the side of the pivots—form an angle of at least 180°.

With this design, it becomes possible to place work pieces with different diameters, for example from 30 to 160 mm diameter, transversely to the chuck axis into this clamping arrangement, to center them and to hold them securely. When this arrangement is disposed on a hinged flap for use as a universal box in a work piece transfer station for the transfer of work pieces being transported on a conveying means to a gripper chuck of a loading arrangement for a machine tool, it is then no longer necessary to exchange the clamping arrangement or transfer box when going from one work piece to a work piece with another diameter. The disadvantages mentioned in the beginning regarding labor cost, interruption of operation and possibility of endangering the operators are, consequently, avoided.

Due to the design of the contact surfaces of the tension levers, it is achieved that a work piece slid into the arrangement transversely to the chuck axis imprecisely with respect to the center of this arrangement is always pressed by the tension levers in the direction of the center without the danger existing that the work piece is pushed out of the tension arrangement. This imprecise position can occur because the work piece, on the one hand, cannot be guided exactly on the conveying means, and on the other hand, because the clamping arrangement is opened further than is the case in the clamped state, so that the work piece is pushed by the conveying means beyond the center.

The connecting lines of the axes of the pivots, preferentially, form with the chuck axis an angle of 90°. This yields a particularly favorable design with respect to securing clamping and centering of work pieces with small to very large diameters.

In order to avoid tilting forces when clamping the work pieces, the two tension levers associated with one pivot are arranged above one another and are, in the bearing region, recessed essentially in each instance by one half the tension lever thickness in the manner of pliers. In this way, the contact surfaces of the tension levers engaging the work piece lie in the same plane.

In order to clamp work pieces with small diameter without the long tension levers interfering with each other, the separately supported tension lever beginning from the convex contact surface is recessed concavely in the direction of its bearing. This avoids that the field of swivel of the tension lever, the contact surface of which lies between the two other tension levers, is interfered with.

A simple and reliable design of the drive for the synchronous deviation of the tension levers results from a particularly favorably design.

For a better understanding of the present invention, reference is made to the following description and ac-

DESCRIPTION OF THE PREFERRED EMBODIMENTS

Figure 1:
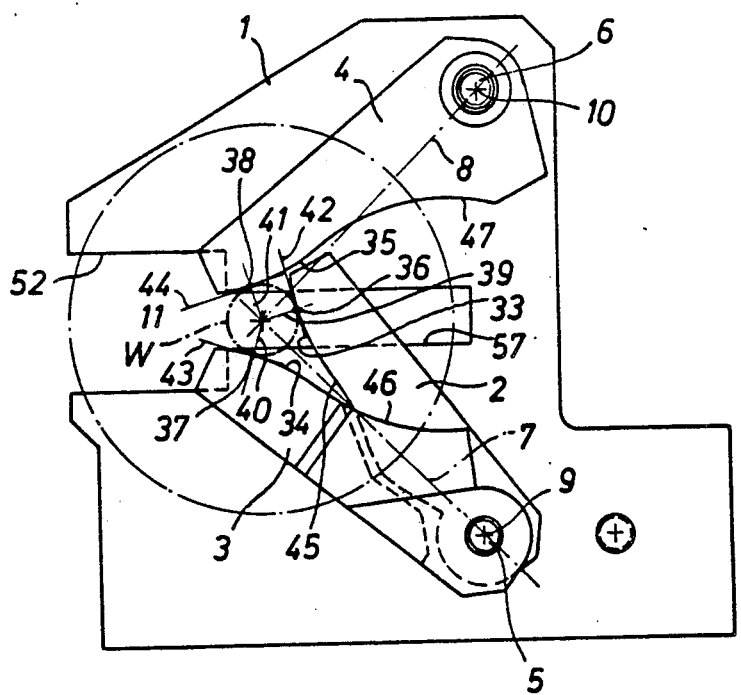
FIG. 1 is a top view of an arrangement for centering and clamping work pieces in a clamping position for the smallest work pieces diameter.
Figure 2:
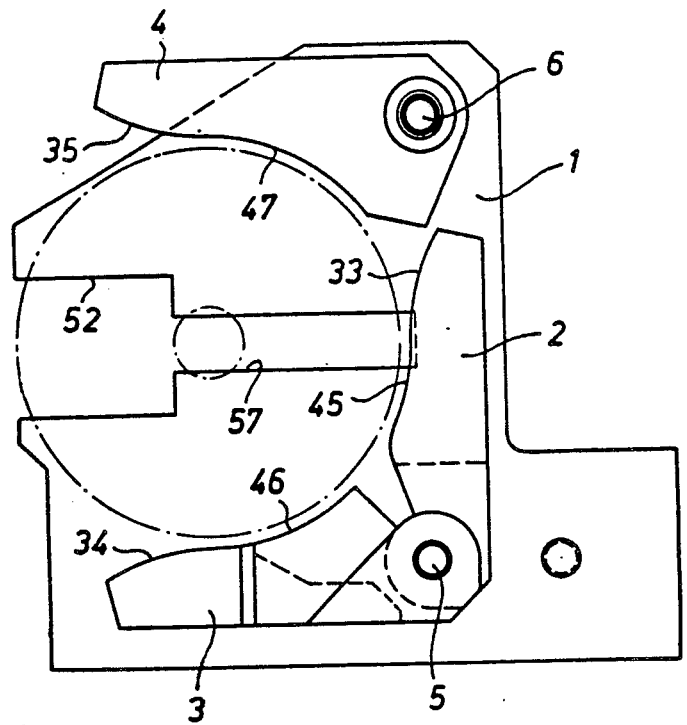
FIG. 2 illustrates an arrangement with a completely open position of the tension levers.

As is clearly evident in FIGS. 1 and 2, which show the arrangement in its two extreme clamping positions, three tension levers 2, 3 and 4 are rotatably arranged on a base plate 1, with the tension levers 2 and 3 being jointly supported on one pivot 5 and the tension lever 4 being supported on another pivot 6. The pivots 5 and 6 are so arranged, that the connecting lines 7 and 8, which connect the axes of rotation 9 and 10 of these pivots 5 and 6 with the center 11 of the chuck, form an angle of 90°. The pivots 5 and 6 are equidistant to the center 11. The tension levers 2, 3 and 4 are so long, that they reach beyond center 11.

For driving the tension levers on the side of the base plate 1 facing away from the tension levers, a driving motor 12, for example, a hydraulic motor or a special electric motor is arranged, which carries a pinion 14 on its driving shaft 13, with which the driving shaft is connected non-rotationally. This pinion 14 meshes with a toothed wheel 15, which is arranged non-rotationally on pivot 5. The tension lever 2 is non-rotationally connected with the pivot 5 and, in this manner, is averted upon rotation of the electromotor 12 due to the driving connection 14, 15.

Since the tension lever 3 during the opening and clamping process must execute a rotating motion, which is opposite with respect to the tension lever 2 on the pivot 5 above the toothed wheel 15, a cam disk 16 is non-rotationally connected with the pivot 5; a connecting rod 18 articulatedly engages the cam 17 of pivot 5 through a hinge bolt 20. With its other end, the connecting rod 18 through a hinge bolt 20 articulatedly engages a cam 21 of a cam disk 22, which is arranged non-rotationally coaxially with the pinion 14 on the driving shaft 13. The cam disk 16 is non-rotationally connected with the second tension lever 3, which is rotatably supported coaxially with the tension lever 2 on pivot 5. Since the driving shaft 13, because of its toothed-wheel connection 14, 15, rotates in the opposite direction to pivot 5, by way of the connecting rod 18, which transmits the rotary motion of the driving shaft in the same direction, the tension lever 3 coupled to the connecting rod 18 is averted in the opposite direction of the tension lever 2. The pivot 5 is rotatably supported in a bearing bushing 23 in the base plate 1 and, in particular, in a ball bearing 24, which is arranged in a housing attached below base plate 1.

For driving the tension lever 4, a further cam disk 26 is non-rotationally connected to the pivot 5; a connecting rod 29 articulatedly engages a cam 27 of pivot 5 through a hinge bolt 28, which is articulatedly arranged with a hinge pin 30 to a cam 31 of a cam disk 32, which is non-rotationally connected with the tension lever 4. Due to this arrangement, the tension levers 2 and 4 execute a motion in the same direction and the tension lever 3 execute a motion in the direction opposite to it.

The tension levers 2 to 4 have convex contact surfaces 33, 34 and 35 in their front region, which extend nearly over one half of the free length of the particular tension lever. With these contact surfaces, the work pieces to be clamped and to be centered are grasped. The shape of these contact surfaces is such that, in the particular contact point 36, 37 and 38 with a work piece W, the straight lines 39, 40 and 41 through this point and the center 11 are perpendicular to tangent 42, 43 and 44 at this point on the contact surface. Since the connecting straight lines 40 and 41 form, when viewed from the side of the pivots 5 and 6, an angle greater than 180°, a force directed onto the work piece W by all tension levers on the center 11 is generated. This, by necessity, forces the work piece, independently of its position when placed in the arrangement, into the center. This ensures center tension of the work piece independently of its diameter.

The tension levers 2, 3 and 4 have concave faces 45, 46 and 47 in the region bordering on the contact surfaces 33, 34 and 35 in the direction toward the bearing, which are circular arc-shaped. This leads to an increasing width of the tension levers in the direction toward the hinge axis. This shapes the tension levers correspondingly to the flexural torque so as to be increasing in the direction toward the rotational axis. In addition, this makes possible the insertion of work pieces with very large diameter, since these faces 45 to 47, in spite of the increase of the tension lever width, represent recesses. The recess 47 permits the tension lever 2 to traverse past the tension lever 4.

The arrangement described above is used in the represented embodiment as a universal box for transferring work pieces from a chain conveyer to a gripper of a loading arrangement or for carrying the work piece from the gripper of a loading arrangement to a conveying means, for example, a chain conveyer.

Figure 3:
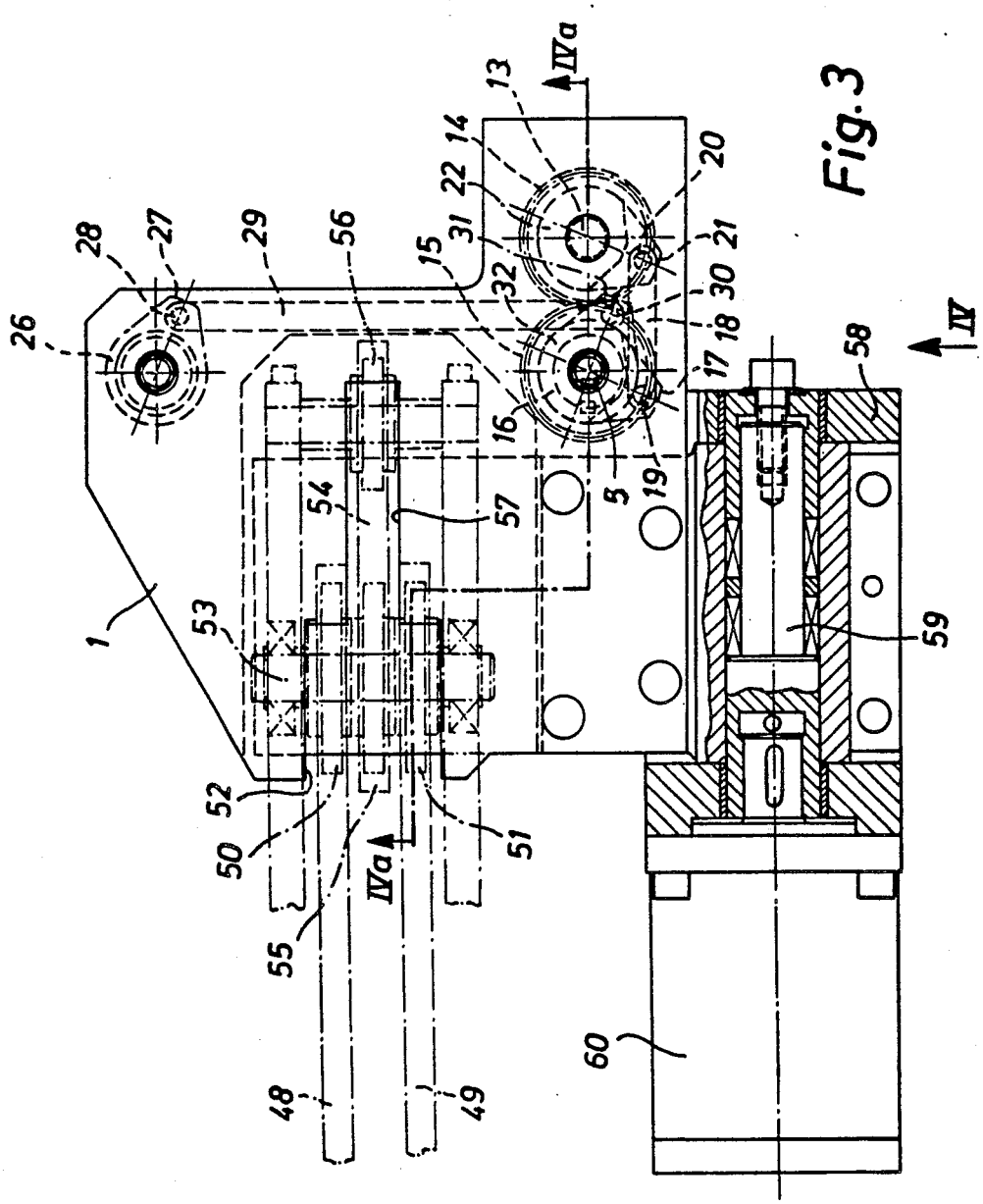
FIG. 3 is a top view corresponding to FIG. 1 without tension levers.
Figure 4:
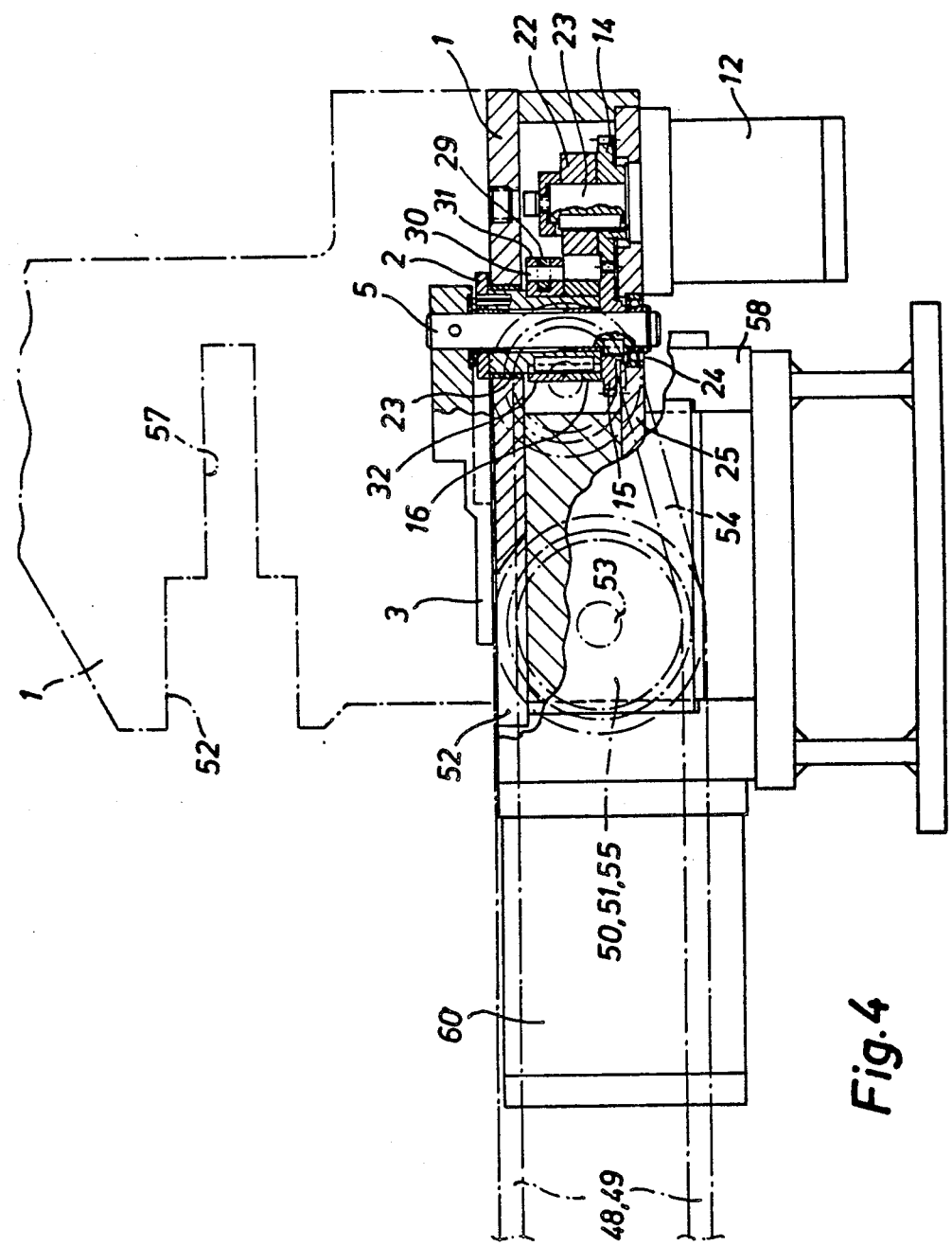
FIG. 4 shows a partially cut lateral view along line IVa—IVa of FIG. 3 in the direction of arrow IV in FIG. 3.

As is particularly evident in FIG. 3, a chain conveyer comprises two conveyer chains 48 and 49, which reach to the region of the base plate 1, and which are guided over chain wheels 50 and 51, which are rotatably supported on a shaft 53 below a cutout 52 in the base plate 1. The chain wheels arranged at the other end of the conveyer chains 48 and 49 are not shown in the drawing. The chain wheels 50 and 51 are at a distance from each other, such that, between these chains, an additional conveying chain 54 can fit, which—on the one hand—through a chain wheel 55 is similarly supported on shaft 53, and—on the other hand—is guided over a chain wheel 56 supported below the base plate 1. In the region of this conveyer chain, a cutout 57, corresponding essentially to the width of the conveyer chain 54, is provided in the base plate 1. By way of the conveyer chains 48 and 49, a work piece is transported to the base plate 1 into the region of the cutout 52. There, the work piece is taken over by the individual chain 54 and pressed against the tension lever 2, which is—as are also the two other tension levers—in the open state corresponding to FIG. 2. The conveyer chains extend to a slight degree through the cutouts 52 and 57, so that the work piece is also carried by the conveyer chains in the region of the base plate 1. When the work piece is in contact with the opened tension lever 2, the tension levers are averted with the driving motor 12 which presses the work piece due to the shape of the contact surfaces 34, 35 and 36 into the center of the clamping arrangement and there clamps it tightly.

To transfer the work piece to the gripper chuck of a loading arrangement, the base plate 1 is swingably supported with a shaft 59 in a machine-stationary stand 58, which shaft 59 can be rotated by an electromotor 60 by 90°, so that the base plate 1 also executes a rotating motion 90° from the horizontal position to a vertical position, in which the work piece clamped by tension levers 2, 3 and 4 can be transferred to a gripper chuck or can be taken over by gripper chuck.

Since, with the arrangement shown in the embodiment, work pieces having a diameter between approximately 30 and 160 mm can be centered and clamped, the time-consuming and tedious exchange of transfer boxes customary until now becomes superfluous. With other sizes, different diameter ranges can be handled.

While the foregoing description and drawings represent the preferred embodiments of the present invention, it will be obvious to those skilled in the art that various changes and modifications may be made therein without departing from the true spirit and scope of the present invention.

What is claimed is:

1. In an arrangement for centering and clamping work pieces with three tension levers pivoted around pivots arranged parallel to a chuck axis, which can be driven synchronously and wherein said pivots are equidistant to the chuck axis, the improvement comprising: two pivots; one said pivot serving to support two tension levers, the other pivot serving to support one tension lever; the length of each tension lever being greater than that corresponding to the distance of the respective pivot to the chuck axis; connecting lines of the axes of both pivots forming an angle with the chuck axis which is smaller than or equal to 180°; contact bearing surfaces of the tension levers for gripping work pieces being convex so that straight lines from a particular contact point where workpieces are perpendicular to tangents to the convex contacts surfaces extend through the chuck axis; one tension lever associated with the pivot supporting two tension levers and the tension lever supported by the other pivot being outer tension levers and straight lines connecting the contact points of said two outer tension levers with the chuck axis, when viewed from the side of the pivots, forming an angle of at least 180°.

2. An arrangement as in claim 1, wherein the connecting lines of the axes of the pivots form an angle of 90° with the chuck axis.

3. An arrangement as stated in claim 1 or 2, wherein the two tension levers supported by said one pivot lie above one another and in the contact bearing region, in the manner of pliers, are recessed by one half the thickness of the tension lever.

4. An arrangement as in claim 1, wherein the individually supported tension lever is recessed concavely beginning at the convex contact bearing surface.

5. An arrangement as in claim 1, wherein the first of the two tension levers supported coaxially is connected non-rotationally with a toothed wheel, which meshes with a driving pinion of a driving motor, wherein the second tension lever of the two tension levers supported coaxially is connected non-rotationally with a first cam disk rotatably supported opposite the pivot, the cam of which a connecting rod engages articulatedly, and, at its other end, is articulated with a cam of a second cam disk which is connected non-rotationally with the driving pinion, and wherein, coaxially with the toothed wheel, a third cam disk is connected non-rotationally with the first cam disk, which through a connecting rod engaging it articulatedly is articulated with a fourth cam disk, which is non-rotationally associated with the separately supported tension lever.

6. An arrangement, as in claim 1, which is arranged on a hinged flap for use as a universal box in a work piece transfer station for the transfer of work pieces transported on conveying means to a gripper chuck of a loading arrangement for a machine tool or for the transfer of the work pieces from the gripper chuck to a conveying means.

* * * * *